Patented Sept. 8, 1931

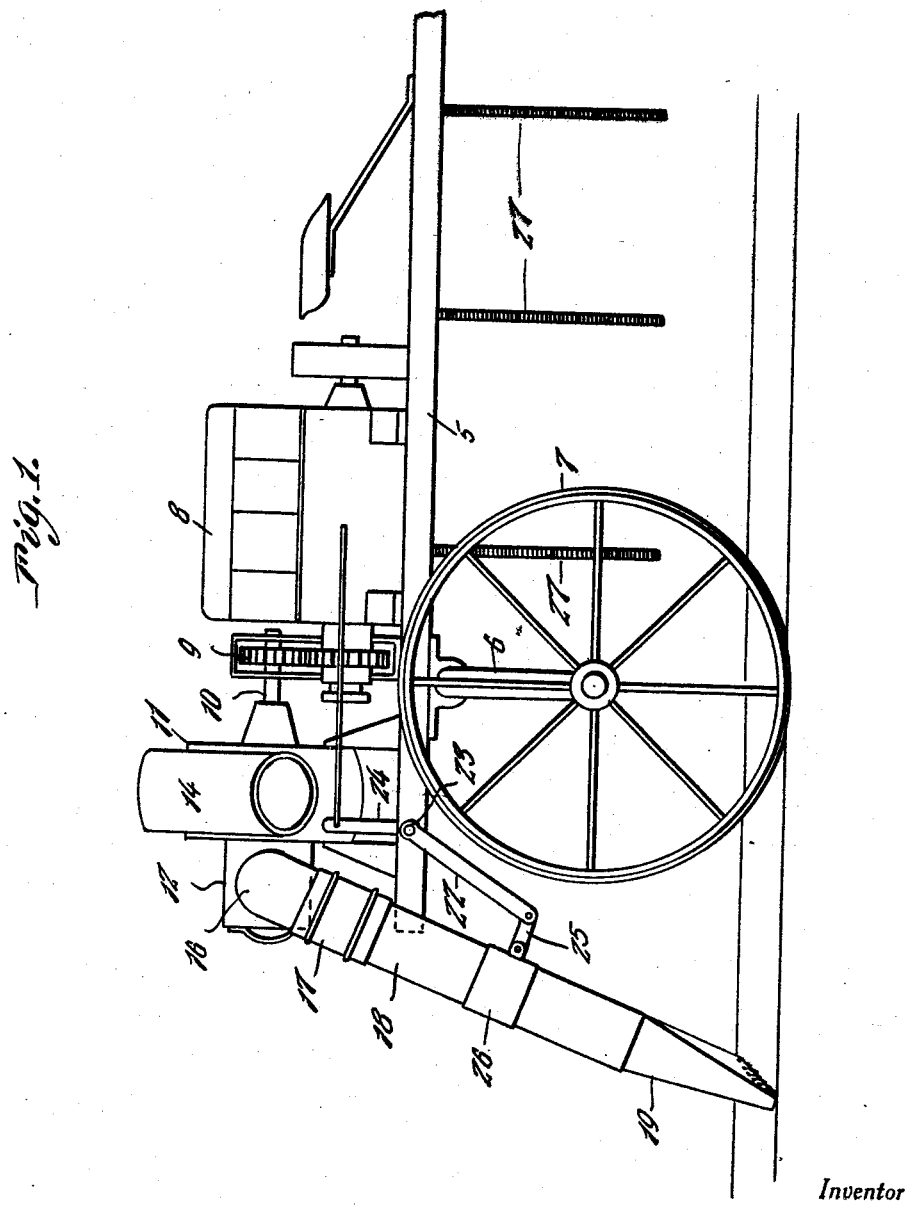

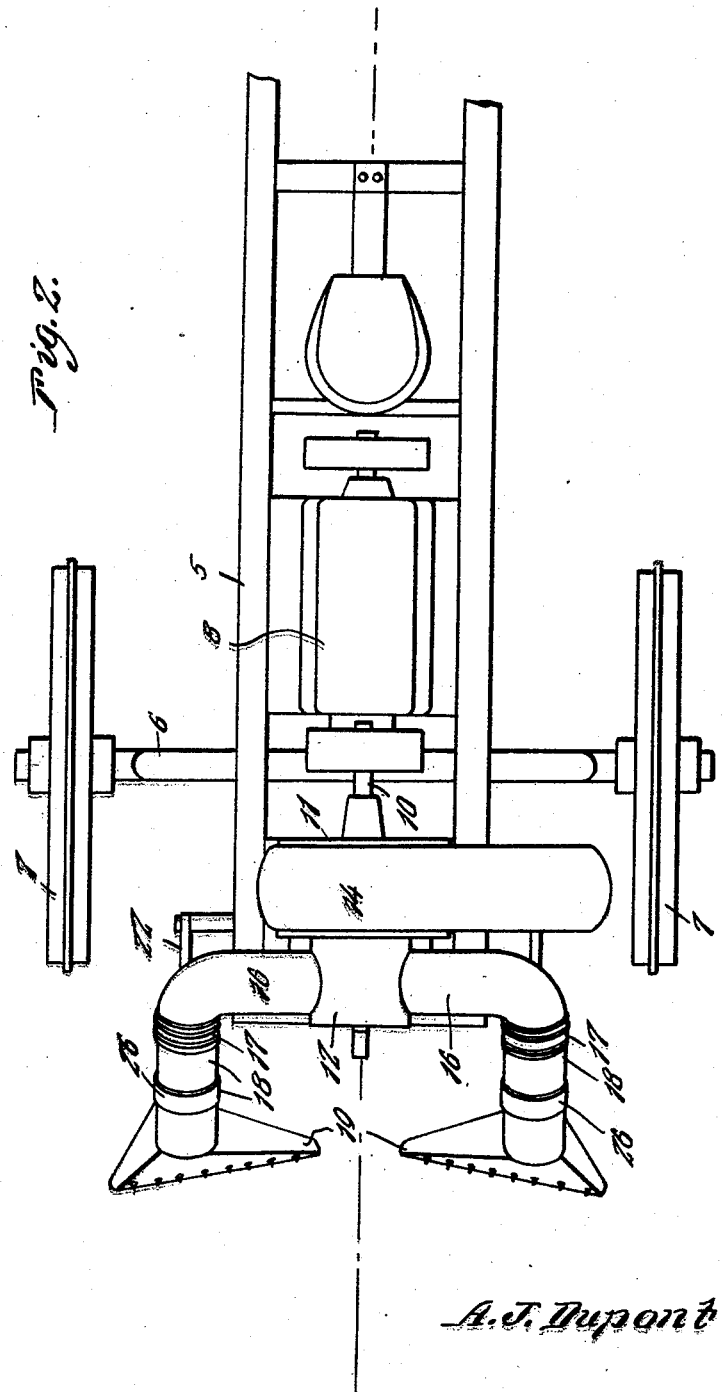

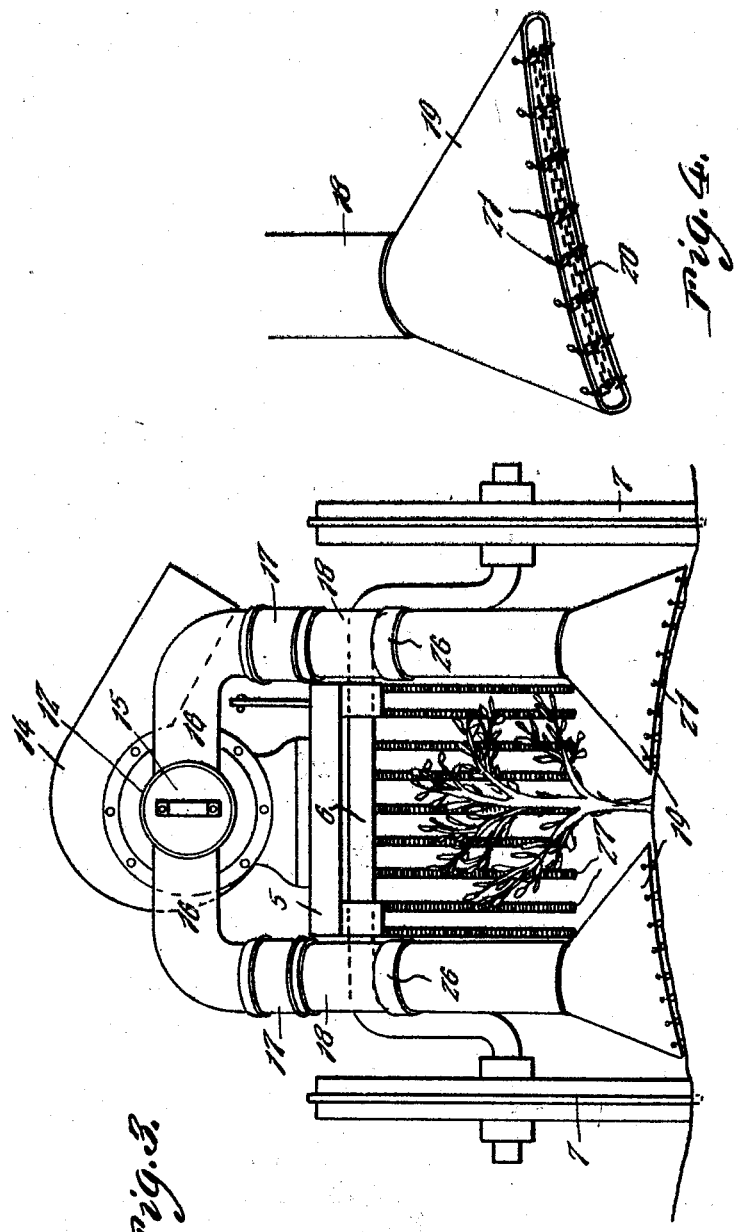

1,822,277

UNITED STATES PATENT OFFICE

ADOLPH J. DUPONT, OF RAYNE, LOUISIANA

BOLL WEEVIL INSECT DESTROYER AND GATHERER

Application filed October 3, 1929. Serial No. 397,016.

The present invention relates to insect destroyers and particularly to machines for destroying boll weevils.

The primary object of the invention is to provide a pneumatically operated machine for gathering up the boll weevils for destruction purposes.

Another important object of the invention resides in the provision of a machine of this character which can be drawn over a field to straddle a row of plants, knock the boll weevils from the plant and pick them up off the ground.

Another object is to provide a machine of this character which is compact, convenient in its construction and arrangement of parts.

Another very important object of the invention resides in the provision of a machine of this nature which is simple in construction, comparatively inexpensive to manufacture, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of the machine embodying the features of my invention, Figure 2 is a top plan view thereof, Figure 3 is a rear elevation thereof, Figure 4 is a perspective view of one of the nozzles.

Referring to the drawings in detail it will be seen that the numeral 5 denotes a suitable frame mounted on an arch axle 6 having wheels 7 journaled on the extremities thereof so that the frame 5 is sufficiently high to clear a row of cotton plants as indicated to advantage in Figure 3.

An engine 8 is carried by the frame 5 and operatively connected by suitable gearing 9 with the shaft 10 of a pneumatic suction mechanism 11 of the centrifugal type having a central rearwardly extending inlet 12 and an outlet 14 which may be connected with any suitable insect suction apparatus or means.

A suitable plug or the like 15 closes the rear end of the inlet. Elbow branches 16 extend laterally from the inlet 12 and are curved downwardly and rearwardly and have flexible tubes 17 connected therewith, these flexible tubes 17 being connected with elongated downwardly and rearwardly inclined tubes 18 with downwardly flared and flattened intake hoods 19 across the mouths of which are disposed chains 20 held in place by cross chains 21.

These hoods 19 drag along the ground as the machine moves forwardly. Cranks 22 on a shaft 23 with suitable rocking means 24 connected thereto, are connected by links 25 with collars 26 circumjacent the intermediate portions of the tubes 18 so that by rocking the shaft 23 each of the tubes 18 may be swung rearwardly for raising the hoods 19 from the ground if so desired.

A plurality of spring agitators 27 are mounted in groups across the frame to depend downwardly therefrom. As the machine moves along over a row of plants these agitators 27 knock the boll weevils and other insects from the cotton plant so that they fall on the ground and are sucked up in the hood 19, tubes 18, flexible tubes 17, branches 16 into the inlet and then through the suction mechanism 18 and out through the outlet 14 to any suitable destruction means or apparatus.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A device of the class described comprising a wheel supported frame, a suction device located thereon, a motor on the frame for operating said device, a rearwardly extending tubular inlet extension connected with the suction device and having its rear end open, a removable cap for closing said extension, a laterally arranged pipe connected to each side of the extension and having an elbow at its outer end depending downwardly and rearwardly, a flexible sleeve connected to each elbow, a pipe connected to the lower end of each sleeve, a laterally arranged flattened nozzle connected to the lower end of each pipe and having its lower end slightly concaved lengthwise of the nozzle, a shaft extending crosswise of the frame, an arm on each end of the shaft, a link connecting the lower end of each arm to the nozzle carrying pipe, and means for rocking the shaft to raise and lower the nozzles.

In testimony whereof I affix my signature.

ADOLPH J. DUPONT.